Oct. 25, 1938.    M. M. BORDEN    2,134,597
COMPENSATED FLOW CONTROL SYSTEM
Filed March 25, 1937    4 Sheets-Sheet 1
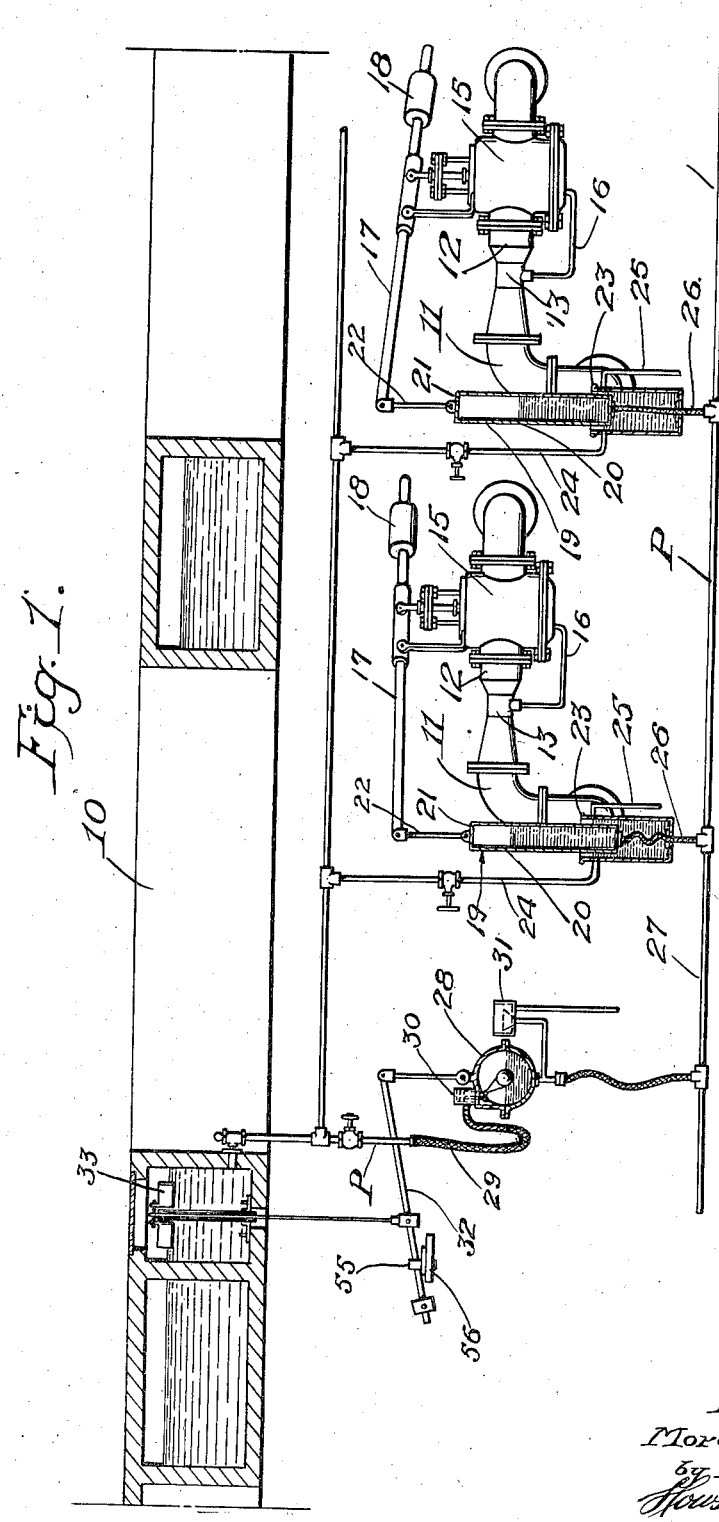
Inventor:—
Moro M. Borden
by his Attorneys
Howson & Howson

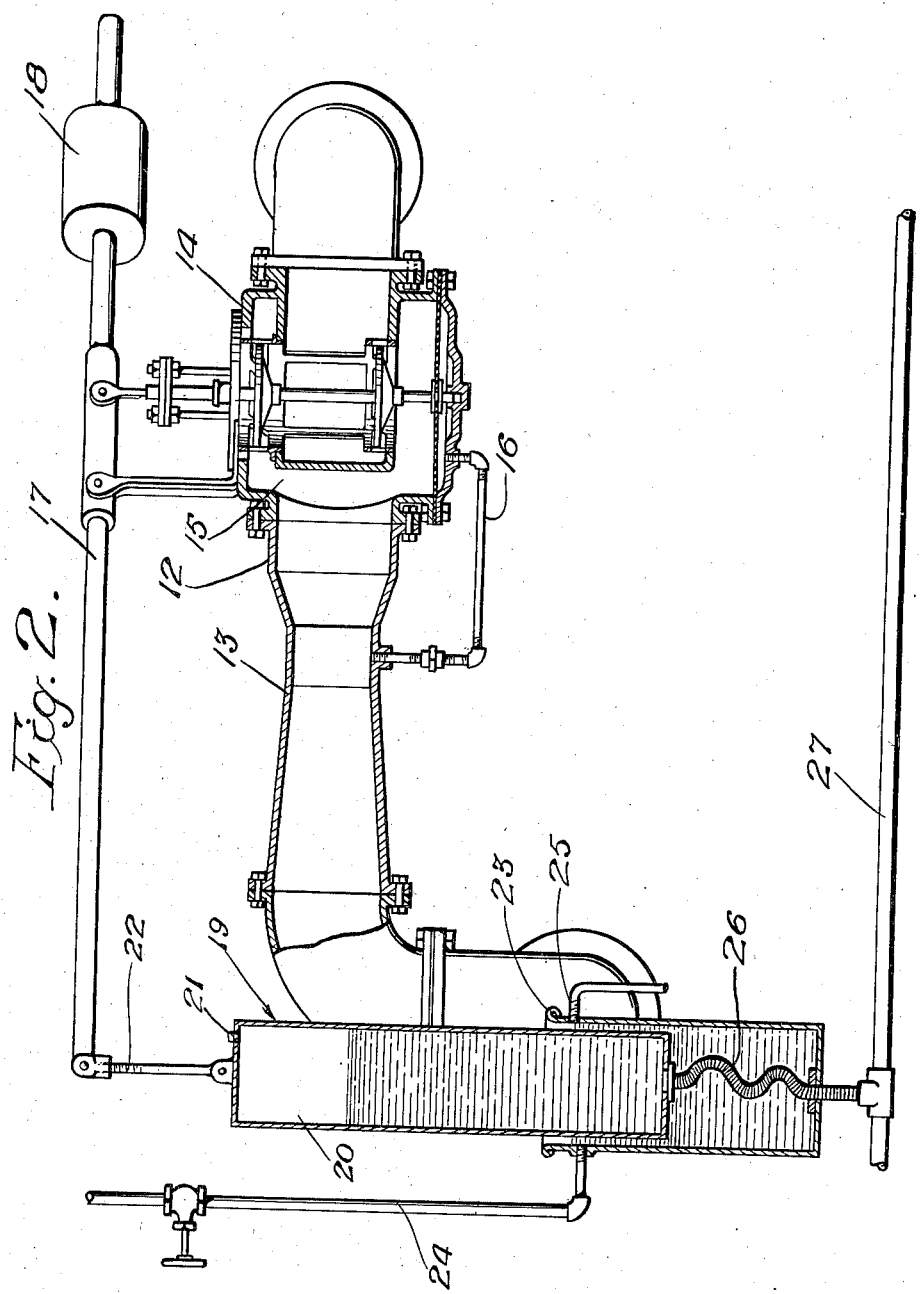

Oct. 25, 1938.         M. M. BORDEN         2,134,597
COMPENSATED FLOW CONTROL SYSTEM
Filed March 25, 1937         4 Sheets-Sheet 3
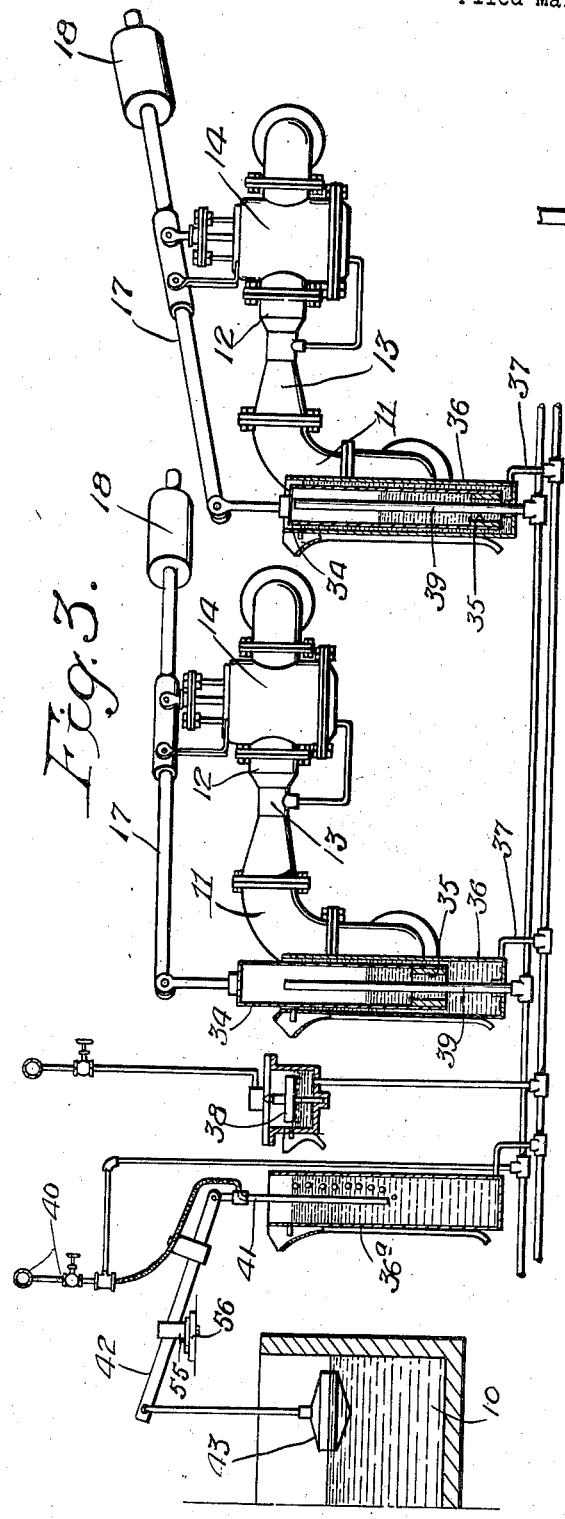
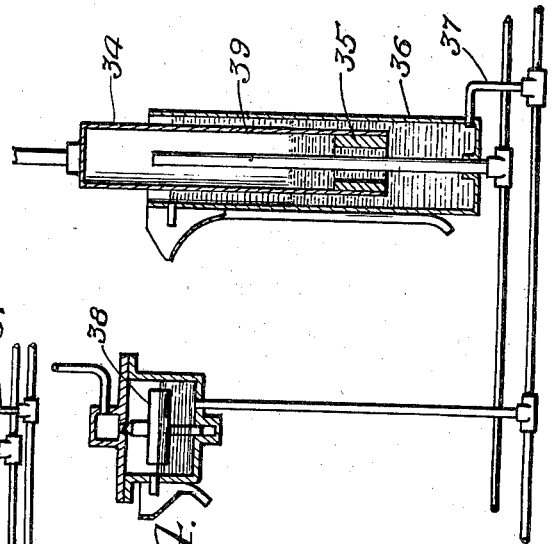
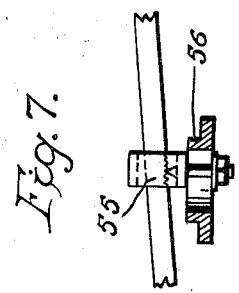
Inventor:—
Moro M. Borden
by his Attorneys
Howson & Howson Oct. 25, 1938.  M. M. BORDEN  2,134,597
COMPENSATED FLOW CONTROL SYSTEM
Filed March 25, 1937  4 Sheets—Sheet 4
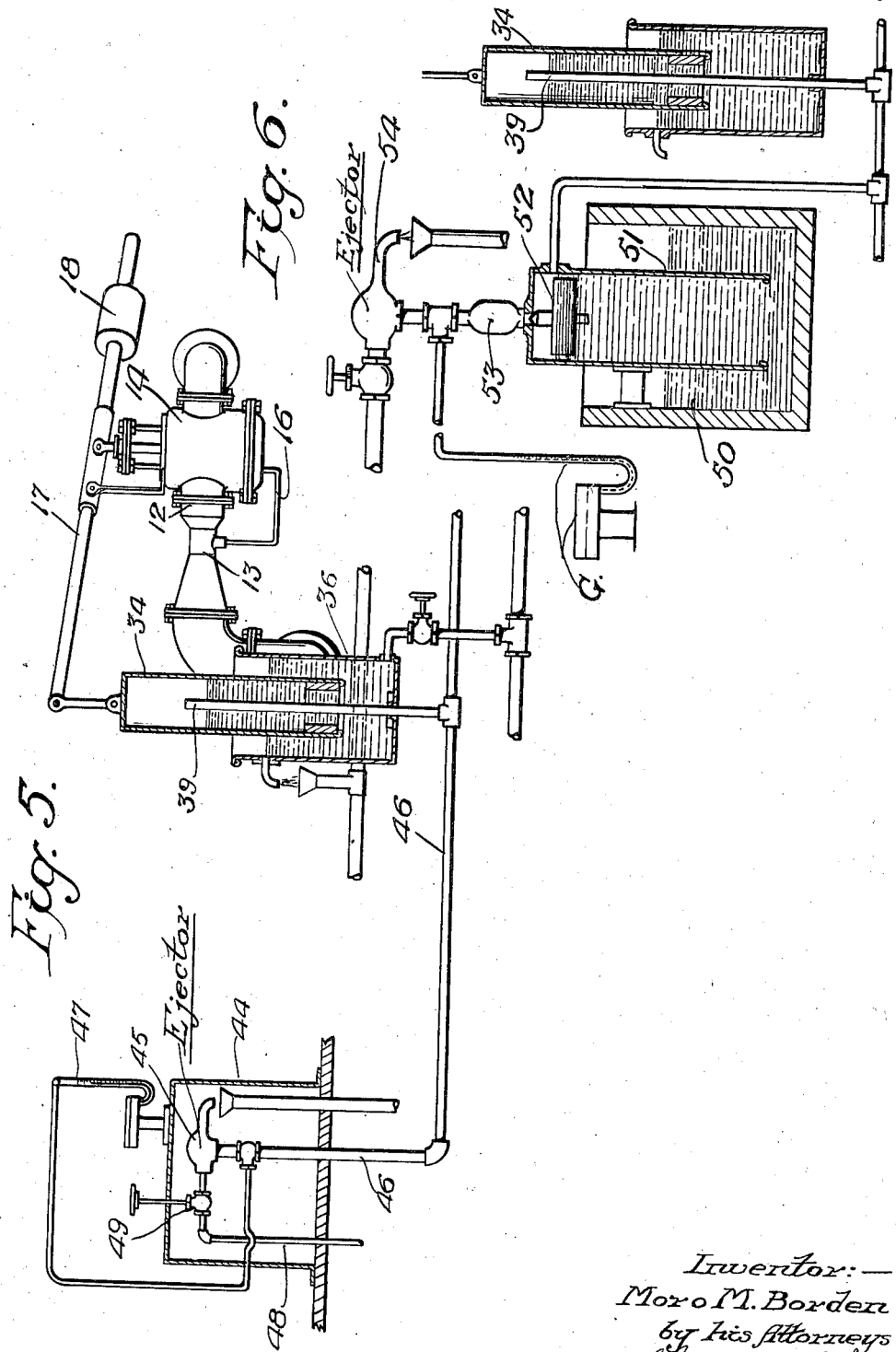
Inventor:—
Moro M. Borden
by his Attorneys
Howson & Howson Patented Oct. 25, 1938

2,134,597

UNITED STATES PATENT OFFICE 2,134,597

COMPENSATED FLOW CONTROL SYSTEM

Moro M. Borden, Philadelphia, Pa., assignor to Simplex Valve and Meter Company, Philadelphia, Pa., a corporation of Delaware Application March 25, 1937, Serial No. 133,067

12 Claims. (Cl. 137—68)

This invention relates to a master control system for flow controllers.

As is well known to those familiar with the art, the usual flow controller comprises a controller casing, usually Venturi-form, a valve to control the flow through the casing, and means controlled by the rate of flow through this casing for regulating the position of the valve. Usually such rate controllers have associated therewith a counterbalancing means for modifying the operation of the automatic control of the valve. In my prior Patent No. 1,988,992, granted January 22, 1935, for Automatic volume controller, I have described an apparatus of this latter character in which the effective weight of the counterbalance is fluid-controlled so that the position of the valve as determined by the automatic means may be modified from a remote point. In the construction illustrated in said patent, the purpose of the counterbalance means was primarily that of rendering operative or inoperative the flow controller proper.

An important object of this invention is the adaptation of a construction of that character to an automatic or master control system whereby the fluid level at a remote point is made to control the effective weight of the counterbalancing means.

Obviously, in such a construction where the fluid supply to the counterbalancing means is continuous but inconstant, a variable effect will be produced modifying the operation of the automatic control means. Quite as obviously, since the communication between the source and counterweight must be continuous in order to provide this variation, any vertical shift in the position of the counterweight will produce a change in the effective weight of the counterweight so that changes in position of the counterweight through the automatic means would tend to nullify or render inaccurate the remote control. Accordingly, a further object of the present invention is the provision of a supply means and control for the effective liquid supply to such counterweights of such character that without regard to the position of the counterweight its effective weight remains constant.

These and other objects I attain by the construction shown in the accompanying drawings wherein:

Fig. 1 is a diagrammatic view showing one form of rate controller constructed in accordance with my invention;

Fig. 2 is a sectional view through a typical flow controller showing counterweighting means constructed in accordance with my invention applied thereto;

Fig. 3 is a diagrammatic view of a slightly modified form of my invention;

Fig. 4 is an enlarged detail sectional view through the counterweighting mechanism illustrated in Fig. 3;

Fig. 5 is a diagrammatic view showing an apparatus of this character manually controlled and operated by means of a negative head;

Fig. 6 is a view partially in section showing an automatic control employing a negative head; and Fig. 7 is a fragmentary view illustrating the pivot mounting for the level control levers of the structures illustrated in Figs. 1 to 5.

Referring now to the drawings, the numeral 10 designates a flume, or other container, for liquids the level in which is variable; 11, flow lines associated with such container, the flow through which should be controlled by the liquid level of the container; and 12, flow controllers in said lines to control the flow therethrough. While two liquid lines 11 and their associated flow controllers are illustrated in diagrammatic Figures 1 and 2, it must be understood that this arrangement is merely for convenience, illustrating the fact that the effective weights of the counterweights remain substantially constant without regard to the position of the controllers, one of the controllers being illustrated in an intermediate valve-open position and the other thereof in a valve-closed position. As will become obvious from the following discussion, the number of flow lines associated with a single control is immaterial, one or more being employed as desired.

As more clearly shown in Fig. 2, a typical flow controller usually comprises a Venturi element 13, a movable valve 14 for controlling flow through the controller casing 15 and an automatic means 16 for shifting the valve 14 in response to differences of pressure set up in the venturi as a result of flow through the casing. Action of the automatic means is modified through a counterbalance system comprising a pivoted rod 17 connected to the valve and having at one end an adjustable counterweight 18 of fixed value as regards its position.

In accordance with my invention, I provide this arm 17 at its opposite end with a counterweight 19, the effective weight of which may be controlled from a remote point. In the form shown in Figures 1 and 2 this counterweight has the form of a thin-walled tubular chamber 20 vented at its upper end as at 21 and supported from the bar 17 through a link 22 which is adjustable as to length. The lower end of this container extends into an open-topped vessel 23 in which a uniform liquid level is maintained. In the present instance a fluid supply line 24 leads to the cylinder through which a trickle of fluid may be continuously admitted thereto, and the cylinder is provided with an overflow drain 25. The lower end of the container 20 is connected through a flexible conduit 26 with a supply conduit 27 receiving its supply from a float chamber 28. In float chamber 28 a constant level of liquid is provided through a continuous liquid supply 29 controlled by a float valve 30, the chamber being provided with an overflow 31 to prevent the collection of excess fluid therein. The head provided by this float chamber in conduit P is controlled from the level in the container 10. In the present instance, the float chamber 28 is shown as supported from a lever 32, the position of which is controlled by a float 33 in flume 10.

Considering the structure just described, it will be obvious that in any given position of the float chamber 28 a given head will be provided in containers 20 determined by the difference in level between the float chamber and vessels 23, and it will also be obvious that a change in the vertical position of the float chamber 28 will result in a change in the effective fluid content of the containers 20.

Examining Fig. 1, it will be seen that while the actual fluid content of the left-hand container 20 is greater than that of the right-hand container, due to the lowered position of the left-hand container, the excess fluid therein is offset by the submergence of the container in the fluid in vessel 23. Therefore, while the liquid level in these containers may be continuously controlled from a remote point, the effective weight of fluid varies only as controlled from such remote point, thereby eliminating the extensive variation which would result from the varying fluid content were the cylinders 23, or a corresponding structure, not employed therein and substituting therefor the comparatively negligible variation introduced by the variable submergence of the thin side walls of the container.

In the form shown in Figs. 3 and 4, while the principle of operation just described is retained and the arrangement, insofar as concerns the container 10, flow lines 11 and controllers 12 is substantially identical, the type of counterweight is modified. In this construction, the counterweight is in the form of a thin-walled cylinder 34 closed with the exception of its lower end, the lower end of the cylinder being preferably counterweighted as at 35. This lower end is inserted within a vessel 36 within which a constant liquid level is maintained. While the method employed for vessels 23 of Figs. 1 and 2 might be utilized, a modified form is illustrated in which the vessels 36 are in communication with a common source 37 of liquid, the head of which is controlled through a float valve 38. Through the lower end of each vessel 36 extends a supply pipe 39 discharging into the cylinder 34 at a point above the liquid level of vessel 36. This supply pipe is in communication with a source of air, or other gaseous fluid, as indicated at 40, such source being likewise in communication through the same conduit system with a tube 41 the lower end of which is extended into a vessel 36a identical with vessels 36 with the exception of the fact that no supply pipe 39 extends thereto. Through a lever 42 and a float 43, the position of which is controlled by the liquid level in the container 10, the extent to which the tube 41 projects into the fluid in vessel 36a is determined, this in turn determining the head pressure at which the gaseous fluid from the supply 40 may escape and consequently the pressure delivered by such supply to the interior of cylinders 34.

This fluid pressure introduced to the cylinder 34 will, in turn, displace a head of the fluid content of the associated vessels 36 lowering the level within the cylinder and creating a corresponding variation in buoyancy on the part of the cylinder varying the effective weight thereof to an extent proportional to the extent of submergence of the outlet end of tube 41.

As in the construction previously described, the vertical position of the cylinder causes no change in the effective weight of the counterweight except for the very slight variation caused by the submergence of the relatively thin walls of cylinders 36, it being noted from the extreme positions illustrated that without regard to the position of the main counterweight body the counterweight element 35 thereof is continuously submerged.

Heretofore I have described the control apparatus as operating through use of a positive head and as automatically controlled. In the form of the invention shown Fig. 5, these conditions are changed, the operation being through a negative head and the control a manual one. The apparatus employed, insofar as the counterweight and the controller mechanism is concerned, is identical with that shown in Fig. 3, and needs no further description here. The control apparatus illustrated comprises a control stand 44 within which is arranged an ejector 45, the vacuum connection of which communicates through a conduit 46 with conduit 39 leading into the lower end of the counterweight 34, the conduit 46 likewise connecting with a suitable gauge 47. The supply 48 to the ejector is controlled through valve 49, and it will be obvious that any desired vacuum may be created within the counterweight 34, and the extent thereof will be registered upon the gauge. Obviously, the vacuum created in the container will constitute a load on the arm of the control varying in accordance with the intensity of the vacuum. Thus, an operator may vary the conditions at a given controller, or group of controllers, at will.

In Fig. 6 an automatic control employing a negative head is illustrated. In this figure the numeral 50 indicates a fluid container from the fluid level of which it is desired to control the operation of a controller such as that shown in Fig. 5. Into the liquid in the container 50 I extend an open-bottomed chamber 51 within which is arranged a float valve 52 the valve of which controls communication of the chamber with the vacuum connection 53 of an ejector 54. The upper end of chamber 51 is placed in communication with the inlet pipe 39 of the counterweight. The interconnection of the ejector and chamber may be likewise connected to a gauge G as in Fig. 5.

It will be obvious that the ejector will create a vacuum within the chamber and the connection to pipe 39 until communication between the ejector and chamber is cut off by a raise of the float valve 52 to a predetermined level, thus creating a negative head in the counterweight equal to the difference between the actual level in container 50 and such predetermined level. It will also be obvious that this negative head will vary in accordance with the level in container 50. It will also be obvious that in a structure such as that shown in Figs. 1 to 4, it is possible to regulate the extent of flow control valve operation as compared to the level variation by simply adjusting the pivot block 55 of the levers 32 or 42 upon the pivot block support, as suggested in Fig. 7. Additionally, it will be understood that the liquid level at the controlling source 10 may be varied either by supply or withdrawal by the controllers 12 or other manually controlled valves. This may be conveniently arranged by merely providing a manually controlled supply mechanism for regulating the fluid level at the source. It will also be obvious that the positions of elements 28 or 41 might be directly manually controlled.

While I have described this structure and illustrated the same as particularly adapted for use in conjunction with flow controllers and remote controls therefor, it will, of course, be understood that it is adapted for use in any situation wherein it may be desired to employ a variable weighted counterweight the effective weight of which is to be controlled from a distance; I, accordingly, do not wish to be understood as limiting myself to the particular arrangement hereinbefore set forth except as hereinafter claimed.

I claim:

1. In a control system of the type described, the combination with a flow controller comprising the usual controller casing, a control valve within the casing, means to automatically position said valve in response to flow through the controller casing and a vertically movable counterweight to modify the operation of said positioning means, of a container for fluid in which the lower end of the counterweight is continuously immersed, means to maintain a constant level within said container and means to create a fluid head varying with changing conditions at a selected source served by said flow controller and to apply said fluid head to the counterweight to vary the effective weight thereof.

2. A device as claimed in claim 1 wherein the counterweight comprises a liquid container, and the head creating means comprises means for maintaining a liquid level in the container varying in accordance with conditions at said source.

3. A device as claimed in claim 1 wherein the counterweight comprises a liquid container, and the head creating means comprises a chamber, means for maintaining a fixed fluid level in said chamber, and means to raise and lower said chamber in accordance with varying conditions at the source.

4. A device as claimed in claim 1 wherein the counterweight is an open-bottomed chamber and the head creating means comprises means for introducing a gas to the counterweight under a pressure varying with conditions at said source.

5. A device as claimed in claim 1 wherein the counterweight is an open-bottomed chamber and the head creating means comprises a source of gaseous fluid under pressure and in communication with the interior of the counterweight, an outlet for said source comprising a tube having its lower end submerged in a body of fluid of fixed level and means for raising and lowering said tube in accordance with varying conditions at said source.

6. A device as claimed in claim 1 wherein the counterweight is an open-bottomed chamber and the head-creating means comprises means for creating a vacuum in the counterweight varying with conditions at said source.

7. In a control system of the type described, the combination with a flow controller comprising the usual controller casing, a control valve within the casing, means to automatically position said valve in response to flow through the controller casing and a vertically movable counterweight to modify the operation of said positioning means, of a container for fluid in which the lower end of the counterweight is continuously immersed, means to maintain a constant level within said container, means to create a fluid head, and means to apply said fluid head to the counterweight to vary the effective weight thereof.

8. A device as claimed in claim 7 wherein the counterweight comprises a liquid container and the head creating means comprises means for maintaining a liquid level in the container, and means for varying the liquid level in the container.

9. A device as claimed in claim 7 wherein the counterweight comprises a liquid container and the head creating means comprises a chamber, means for maintaining a fixed fluid level in said chamber, and means to raise and lower said chamber.

10. A device as claimed in claim 7 wherein the counterweight is an open-bottomed chamber and the head creating means comprises means for maintaining a gas supply in the counterweight, and means to vary the pressure of the contained gas.

11. A device as claimed in claim 7 wherein the counterweight is an open-bottomed chamber and the head creating means comprises a source of gaseous fluid under pressure and in comunication with the interior of the counterweight, an outlet for said source comprising a tube having its lower end submerged in a body of fluid of fixed level and means for raising and lowering said tube in accordance with varying conditions at said source.

12. A device as claimed in claim 7 wherein the counterweight is an open-bottomed chamber and the head creating means comprises means for creating a vacuum in the counterweight, and means for controlling the degree of such vacuum.

MORO M. BORDEN.